United States Patent
Rushing

(10) Patent No.: US 6,327,753 B1
(45) Date of Patent: Dec. 11, 2001

(54) CABLE CLAMP

(76) Inventor: Kennedy W. Rushing, 6245 Renwick, Apt. 4610, Houston, TX (US) 77081

( * ) Notice: Subject to any disclaimer, the term of this patent is extended or adjusted under 35 U.S.C. 154(b) by 0 days.

(21) Appl. No.: 09/464,175

(22) Filed: Dec. 16, 1999

(51) Int. Cl.[7] .................................................. F16G 11/00
(52) U.S. Cl. .......................................... 24/135 N; 24/525
(58) Field of Search ........................ 24/135 R, 135 K, 24/284, 115 R, 135 N, 525, 486; 269/282; 403/396, 395, 399, 236, 391, 398, 362, 374.3; 439/804, 785, 791–794, 803, 810–813, 781, 782; D13/149; 411/185, 186, 169, 973, 116, 117

(56) References Cited

U.S. PATENT DOCUMENTS

| | | |
|---|---|---|
| 51,144 | 11/1865 | Chester . |
| 306,078 * | 10/1884 | Hubner . |
| 475,115 * | 5/1892 | Inglesby et al. . |
| 501,973 | 7/1893 | Umbenhauer . |
| 688,360 * | 12/1901 | Stone . |
| 748,716 | 1/1904 | Ford . |
| 1,705,902 * | 3/1929 | Dautch . |
| 2,205,322 | 6/1940 | Thomas .............................. 173/269 |
| 2,287,762 | 6/1942 | Rogoff ............................... 173/269 |
| 2,333,646 * | 11/1943 | Frankel . |
| 2,476,863 * | 7/1949 | Hawes . |
| 2,499,985 * | 3/1950 | Cafiero . |
| 2,532,068 | 11/1950 | Larsen ................................. 24/135 |
| 2,573,276 | 10/1951 | Roberts ................................. 81/33 |
| 2,634,475 | 4/1953 | Browne ................................ 24/135 |
| 2,737,637 | 3/1956 | Scott ................................... 339/244 |
| 2,777,119 | 1/1957 | Edmunds ............................. 339/272 |
| 2,809,363 | 10/1957 | Schertel et al. ...................... 339/272 |
| 2,865,591 | 12/1958 | Holinshead ............................ 251/8 |
| 2,953,796 | 9/1960 | Deviatka .............................. 12/103 |
| 2,958,245 | 11/1960 | Neef et al. ............................. 81/19 |
| 3,029,410 | 4/1962 | Cornell, Jr. ......................... 339/217 |
| 3,072,881 | 1/1963 | Norris ................................. 339/272 |
| 3,124,409 | 3/1964 | Nisula ................................. 339/272 |
| 3,339,174 | 8/1967 | Walter et al. ........................ 339/244 |
| 4,458,975 | 7/1984 | Bohlin et al. ........................ 339/243 |
| 4,471,159 | 9/1984 | Frank, Jr. ............................. 174/94 |
| 4,629,281 | 12/1986 | Krüger ................................ 339/272 |
| 4,646,395 | 3/1987 | Mayszak .............................. 24/135 |
| 4,662,035 | 5/1987 | Hatfield ................................ 24/135 |
| 5,000,705 * | 3/1991 | Kinka et al. . |
| 5,553,787 | 9/1996 | Guginsky ............................ 439/472 |

* cited by examiner

*Primary Examiner*—James R. Brittain
(74) *Attorney, Agent, or Firm*—Akin, Gump, Strauss, Hauer & Feld, LLP; Dwayne L. Mason

(57) ABSTRACT

A clamp for securing wire rope or other flexible cord with a high retention force. The clamp of the present invention has an outer housing with a gripping surface therein for securing wire rope or other flexible cord placed therein against the opposing gripping surface of a traveling block, gripping force being applied by rotation of a threaded member in threaded engagement with outer housing. Wire rope or other flexible cord is thereby gripped with significant control over axial alignment and without compressing segments of wire rope or flexible cord together.

10 Claims, 1 Drawing Sheet

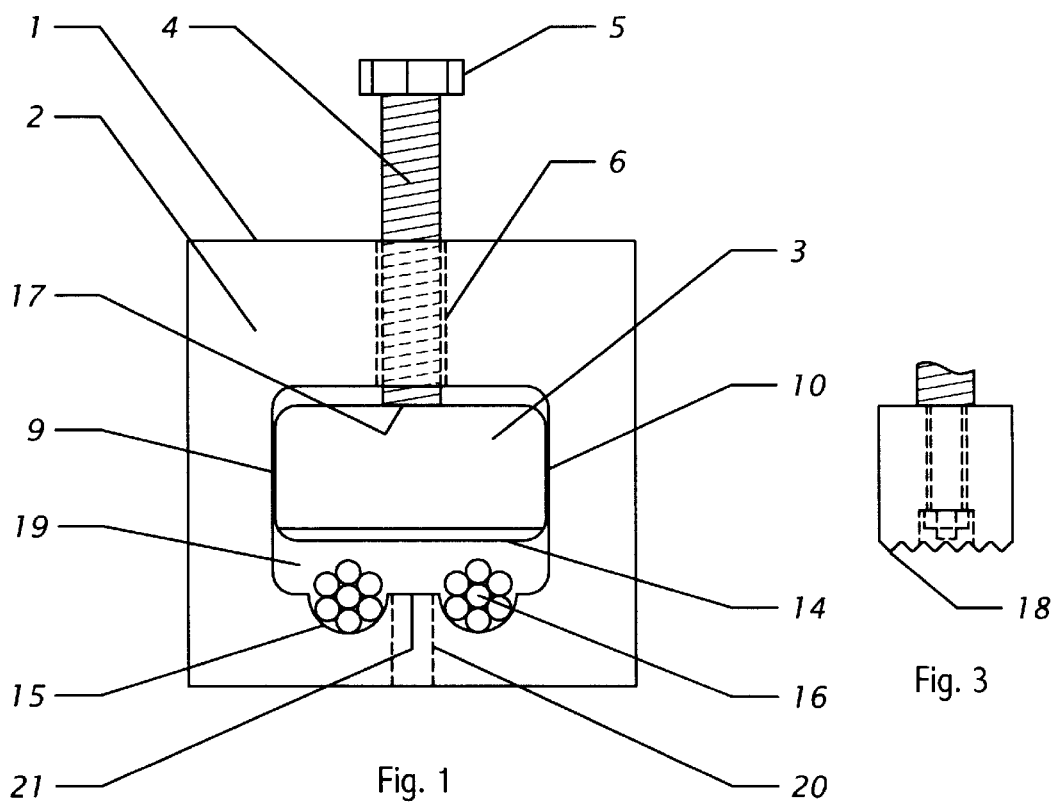
Fig. 1
Fig. 3
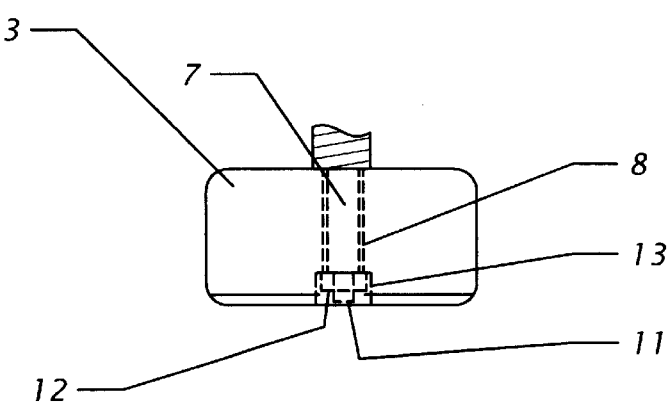
Fig. 2

CABLE CLAMP

TECHNICAL FIELD

This invention relates in general to a clamp used in the fields of construction, transportation, building trades and the like for securing flexible cord, such as wire rope, and in particular, relates to a clamp for securing wire rope in an axially aligned position without causing wire rope segments to be deformed by clamping pressure applied by the clamp.

BACKGROUND OF THE INVENTION

In the fields of construction, transportation, building trades and the like its is often desirable to grip or secure one or more segments of wire rope or other flexible cord. For example, wire rope or other flexible cord is often secured at one end by means of a turn back loop formed from a single piece of wire rope or other flexible cord is drawn at one end through an eyelet or chain plate and brought back to form two segments, which are then gripped with a clamp or wire rope clip. In other applications, two or more pieces of wire rope or other flexible cord are joined or spliced together by one or more clamps placed near the ends of the wire rope or other flexible cord.

Previously existing devices used to secure segments of wire rope in the longitudinal axis include the common saddle-type wire rope clip and later variants of the saddle gripping surface. Examples include the Fist Grip (R) wire rope clip manufactured by the Crosby Group, Inc., and the device described and claimed by U.S. Pat. No. 5,802,680 to Postelwait.

These prior art devices generally employ a saddle configuration gripping surface. Using the saddle configuration, these previous devices grip the wire rope by compressing the segments of wire rope between the saddle at one end, and at the opposing end, either a U-bolt or another saddle portion. In these devices, gripping force is applied by rotation of threaded nuts arranged generally perpendicular to the saddle surface and the longitudinal axis of the wire rope, which forcibly draws or pinches the two segments of wire rope together and places them in gripping contact with the saddle surface and U-bolt, or between the two opposing saddle surfaces.

These prior clamps are generally simple in design, often comprising few parts. Therefore, in cases where components of these prior wire rope clamps fail, for example, stripping of threads or bolts due to the large torques applied to the nuts that cause compression of the wire rope with a high retention force, components such as saddles, U-bolts, or nuts may be interchanged or replaced.

However, certain drawbacks are encountered with the use of saddle-type wire rope clips. First, the shape of the gripping surface, which is either the interior surface of two opposing saddles or the interior surface of a saddle and a U-bolt, generally compresses the two cable segments together at the center, thereby undesirably deforming both the cable surface and the longitudinal axis of the cable segments.

Additionally, in the case of the common single-saddle wire rope clip, the gripping surface of the U-bolt is small in comparison with the gripping surface of the saddle, thereby creating a differential in gripping pressure which tends to alter the longitudinal axis of the wire rope segment gripped by the interior portion of the U-bolt. This differential in gripping pressure of ten times causes the wire rope segment gripped by the U-bolt gripping surface to be pinched in relation to the wire rope gripped by the surface of the saddle. The resulting deformed axis of at least one segment of wire rope thus clamped may create difficulties in maintaining the proper position and axial alignment of the wire rope clamped thereby.

Accordingly, it would be desirable to have a clamp for gripping wire rope or flexible cord with a high retention force, provide for significant control over axial alignment of the gripped wire rope or other flexible cord, avoid pinching wire rope segments in relation to one another, and still have the clamp be simple in design and operation, rugged, and easily repaired.

GENERAL DESCRIPTION

The present invention is generally directed to a clamp for wire rope or other flexible cord having an outer housing forming an inner cavity, a traveling block that is operationally movable with in the outer housing, and a threaded member for causing movement of the traveling block with respect to a gripping surface formed on the lower portion of the inner cavity.

The descriptions which follow are non-limiting embodiments of the invention. The exterior of the outer housing may be formed in many shapes, such as the rectangular cross section shape shown in the preferred embodiment described herein below, or, alternatively, circular, semi-circular, or oval.

The gripping surface formed on the lower portion of the inner cavity and an opposing gripping surface formed on the lower portion of the traveling block are preferably disposed with a plurality of gripping channels or gripping teeth for securely gripping and axially aligning the wire rope or flexible cord gripped thereby. Wire rope or flexible cord segments gripped by the present invention may thus be aligned in the longitudinal axis with respect to each other and, unlike prior clamps, the gripped segments of wire rope or flexible cord are not pinched together and potentially deformed.

The traveling block, which is located substantially within an inner cavity formed by the outer housing, is partially constrained to move in a gripping direction by parallel walls formed in the inner cavity, which interact with similar parallel walls formed on the exterior of the traveling block. The traveling block is further constrained to move substantially within the inner cavity by extending a lower portion of the threaded member at least partly within a hole formed in the traveling block axially aligned with the threaded member.

Gripping movement of the traveling block is caused by rotation of the threaded member placed in threaded engagement with the outer housing along an upper portion thereof. The threaded member is rotatable by means of a common bolt end or has an alternative rotatable fixture common to the art, such as a T-handle, allen-head fixture, knurled knob, etc.

A bearing surface is formed between the upper and lower portions of the threaded member. By rotation of the threaded member, the bearing surface contacts the traveling block and forcibly directs gripping movement of the traveling block in relation to the gripping surface of the inner cavity.

A threaded nut or other fastener, such as a headed screw, allen bolt, or C-clip is fastened to the lowermost end of the threaded member. The threaded nut or other fastener is larger than the diameter of the axially aligned hole within the traveling block. Thus, the threaded member with the threaded nut or other fastener attached thereto rotates freely within the axially aligned hole of the traveling block, yet movement of the traveling block is substantially constrained along the axis of the threaded member.

Optionally, a countersink is formed within the lower portion of the traveling block in axial alignment with the threaded member for the purpose of countersinking the threaded nut or other fastener. The use of the countersink reduces the potential for contact between the threaded nut or other fastener and a surface of the gripped wire rope, thus preventing potential damage to both the wire rope and the threaded nut or other fastener. Further, a release hole may be formed in the lower portion of the outer housing in axial alignment with the threaded member to facilitate removal of the threaded nut or other fastener with the appropriate tool. In the case where a countersink is not employed, the release hole also serves to prevent damage to the threaded nut or other fastener when the traveling block is fully compressed against the gripping surface of the inner cavity.

The threaded nut or other fastener facilitates easy repair or replacement of components of the present invention. The repair or replacement of components is accomplished by removal of the threaded nut or other fastener and counter-rotation of the threaded member to raise the threaded member and remove its lower portion from the axially aligned hole formed in the traveling block. In this manner, the traveling block, as well as all other components of the clamp of the present invention are released and may be removed, repaired or replaced.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

FIG. 1 is a front view of the clamp of the present invention.

FIG. 2 is a side view of the traveling block disclosing the gripping teeth.

FIG. 3 is an end view of the traveling block disclosing the gripping teeth.

DETAILED DESCRIPTION

Referring now to the drawings in detail, FIG. 1 illustrates a frontal view of the preferred embodiment of clamp 1 shown securing wire rope 16, wherein intended features and interior details are shown by hidden lines. Wire rope 16 is gripped between channels 15, formed on the lower portion of outer housing 2 forming inner cavity 19, and gripping surface 14 formed by traveling block 3.

Outer housing 2 of clamp 1 is composed of a relatively rigid material, such as aluminum or steel, or optionally, of a relatively rigid plastic or fiber composite material in situations in which metals may not be favored. Outer housing 2 forms inner cavity 19 defined by parallel walls 9 and 10, and a lower end further comprising gripping channels 15. Inner cavity 19 of the embodiment shown in FIG. 1 is also of generally rectangular cross section. At the lower end of inner cavity 19 of outer housing 2 are placed two or more gripping channels 15 forming a gripping surface for facilitating control over the gripped position of wire rope 16. In this manner, unlike the previous cable clip designs, the individual segments of wire rope 16 are securely gripped, while avoiding compressive contact between the gripped segments and providing significant control over the axial position of wire rope 16.

Parallel walls 9 and 10 of inner cavity 19 of outer housing 2 are flat in the embodiment shown in FIG. 1. While the parallel walls 9 and 10 may be any shape making parallel surfaces, for example grooved or angled, the flat wall configuration shown enables traveling block 3 to be removed from outer housing 2 and replaced or serviced if needed. Parallel walls 9 and 10 are spaced apart at a distance marginally greater than the width of traveling block 3 so as to permit a sliding fit therein. The sliding fit between traveling block 3 and parallel walls 9 and 10 maintains slidable alignment of traveling block 3 with outer housing 2. The arrangement of parallel walls 9 and 10 in slidable engagement with traveling block 3 also contributes to proper alignment of gripping surface 14 of traveling block 3 with gripping channels 15, both while traveling block 3 is moved in the direction of gripping channels 15 through rotation of threaded member 4, and while gripping pressure is applied to wire rope 16 by opposing gripping teeth 18 (FIGS. 2 and 3) and gripping channels 15.

Outer housing 2 also forms threaded hole 6, internally threaded and located near the top of outer housing 2. Threaded hole 6 is perpendicular to gripping channels 15 and extends through outer housing 2 to inner cavity 19. Threaded hole 6 permits threaded engagement by threaded member 4 with outer housing 2 for causing movement of traveling block 3 in relation to wire rope 16 located in gripping channels 15 of outer housing 2. Optionally, a release hole 20 is formed by outer housing 2, preferably centered between gripping channels 15 and near the bottom of outer housing 2, and in axial alignment with threaded hole 6. As more fully described below, release hole 20 facilitates the release of traveling block 3 from threaded member 4 and, if necessary, service or replacement of components of clamp 1.

Rotation of threaded member 4 causes bearing surface 17 formed by threaded member 4 to contact traveling block 3, thereby also causing movement of traveling block 3 relative to outer housing 2 in a direction along the axis of threaded member 4. Accordingly, bearing surface 17 may be a smooth, disk-shaped surface formed substantially parallel to gripping surface 14 of traveling block 3.

Traveling block 3 may be composed of a relatively rigid material, such as aluminum or steel, or optionally, of a relatively rigid fiber composite material in situations in which metals may not be favored. For example, in the preferred embodiment shown, traveling block 3 is composed of steel and is rectangular in cross section, made to a slightly smaller width than the distance between parallel walls 9 and 10. Traveling block 3 has at its lower end a gripping surface 14 which is optionally fitted with, for example, either a plurality of gripping teeth 18 (shown in FIGS. 2 and 3) aligned perpendicular to the longitudinal axis of wire rope 16. In addition to gripping teeth 18, the gripping surface 14 of traveling block 3 may be fitted with channels, much like channels 15.

A hole 8 is formed through the height of traveling block 3. Hole 8 has a diameter slightly greater than, and in axial alignment with, a lower portion 7 of threaded member 4. In this manner, threaded member 4 rotates freely within hole 8, yet remains in threaded engagement with outer housing 2.

Threaded member 4 interacts with outer housing 2 and traveling block 3 to cause gripping or releasing movement of traveling block 3 in relation to gripping channels 15. Threaded member 4 is rotatable by means of a bolt end 5. Threaded member 4 is threadably engaged with threaded hole 6 of outer housing 2.

Lower portion 7 of threaded member 4 extends at least partly below bearing surface 17. Lower portion 7 may be adapted to accept a threaded fastener or nut 12 to permit raising traveling block 3 from gripping contact with wire rope 16 by counter-rotation of threaded member 4. In this manner, axial displacement of threaded member 4, caused by rotation or counter-rotation, corresponds directly to movement of traveling block 3 within inner cavity 19. This may be accomplished by forming a threaded hole on the lowermost end of lower portion 7, adapted to accept threaded fastener or nut 12. Alternatively, a lowermost segment of lower portion 7 may be reduced in diameter and threaded on the exterior thereof to form a third portion 11, also adapted to accept threaded fastener or nut 12.

Releasing the secure grip of wire rope 16 is accomplished by counter-rotation of threaded member 4. Rotation or counter-rotation of threaded member 4 causes upward movement of traveling block 3 with respect to outer housing 2, which releases gripped wire rope 16. Threaded fastener or nut 12, of larger diameter than hole 8, thereby rotates in conjunction with threaded member 4, yet rotates freely within hole 8. This configuration permits rotation, but not axial, movement of threaded member 4 with respect to traveling block 3. Conversely, removing threaded fastener or nut 12 and raising threaded member 4 by counter-rotation movement permits the release or removal of traveling block 3 for service or replacement.

Outer housing 2 may also form a release hole 20 for facilitating the insertion of a tool for facilitating the removal of threaded fastener or nut 12. If traveling block 3 is not fitted with countersink 13, as is optional, then release hole 20 should be of slightly larger diameter than threaded fastener or nut 12. In this manner, when wire rope 16 is gripped by lowering traveling block 3 toward gripping channels 15, a threaded fastener or nut 12 that protrudes below gripping surface 14 will not be damaged by contact with the lower surface of inner cavity 19. Rather than be compressed against a lower surface 21 of inner cavity 19, threaded fastener or nut 12, being of smaller diameter than release hole 20, simply passes into the space formed by release hole 20.

An alternative to forming a comparatively large diameter release hole 20 is shown by forming a countersink 13 in the bottom portion of traveling block 3 in axial alignment with both hole 8 and threaded member 4. Countersink 13 is of slightly larger diameter than hole 8, and extends only partly into traveling block 3.

Countersink 13 permits the attachment of threaded fastener or nut 12 to threaded member 4 such that nut 12 does not protrude below gripping surface 14 and does not contact wire rope 16 is gripped by clamp 1. As mentioned, threaded fastener or nut 12 axially securing traveling block 3 to threaded member 4 may be removed, whereby threaded member 4 may be elevated and traveling block 3 removed from outer housing 2 for service or repair.

The use of countersink 13 does not necessitate the corresponding use of release hole 20. In this case, however, the operator of clamp 1 would have limited visibility and access to threaded fastener or nut 12. Accordingly, outer housing 2 may include release hole 20, even in the case where countersink 13 is employed.

The clamp of the present invention may be utilized on turnback loops formed from a single piece of wire rope, or to splice two pieces of wire rope together. It should also be understood that the clamp of the present invention may also be utilized for other applications where traditional wire rope clips have been utilized. Further, while the preferred embodiment herein described is shown utilized with wire rope or cable, it should also be understood that the invention may also be utilized with traditional braided rope, coated rope and cable, plastic cord, and many other forms of cords and cables, both coated and un-coated.

Whereas the present invention has been described in relation to the drawings attached hereto, it should be understood that other and further modifications, apart from those shown or suggested herein, may be made within the spirit and scope of this invention.

Accordingly, I claim:

1. A clamp for securing flexible cord comprising:
   an outer housing forming a cavity therethrough for disposing flexible cord, said cavity forming a gripping surface on a bottom portion thereof;
   a traveling block moveably disposed within said cavity, said traveling block having a gripping surface thereon that is substantially parallel to and opposing said gripping surface of said outer housing;
   a threaded member in threaded engagement with said outer housing, said threaded member further comprising a lower portion that contacts said traveling block, such that rotation or counter-rotation of said threaded member causes gripping or releasing of said flexible cord between said gripping surface of said traveling block and said gripping surface of said outer housing;
   said lower portion of said threaded member extending at least partly into said traveling block;
   said traveling block forming a hole at least partly therethrough for receiving said lower portion of said threaded member, said hole being in axial alignment with the longitudinal axis of said threaded member;
   a bearing surface located on said threaded member substantially between said upper and lower portion of said threaded member for contacting said traveling block and causing gripping movement of said traveling block;
   a threaded fastener for threadedly engaging said lower portion of said threaded member and securing said traveling block to said threaded member; and
      wherein said outer housing forms a release hole therethrough for facilitating the release of said threaded fastener, said release hole being formed through said gripping surface of said cavity through to the exterior of said outer housing.

2. The clamp of claim 1, wherein one or both of said gripping surfaces of said outer housing and said traveling block has one or more gripping channels thereon, said gripping channels being aligned with the longitudinal axis of said flexible cord, for receiving and gripping said flexible cord therebetween.

3. The clamp of claim 1, wherein one or both of said gripping surfaces of said outer housing and said traveling block has one or more gripping teeth thereon, said gripping teeth being aligned perpendicular to the longitudinal axis of said flexible cord for gripping said flexible cord therebetween.

4. The clamp of claim 1, wherein said gripping surface of said outer housing has one or more gripping channels thereon aligned with the longitudinal axis of said flexible cord, and said gripping surface of said traveling block has one or more gripping teeth thereon aligned perpendicular to the longitudinal axis of said flexible cord, such that said flexible cord may be gripped between said gripping channels and said gripping teeth.

5. The clamp of claim 1, further comprising:
a plurality of substantially parallel walls on opposing interior surfaces of said cavity; and
a second plurality of substantially parallel walls on the exterior of said traveling block for interacting with said parallel walls of said cavity such that movement of said traveling block is at least partially constrained along the longitudinal axis of said threaded member.

6. The clamp of claim 5, further comprising a countersink located on said traveling block axially aligned with said hole for receiving said lower portion of said threaded member, said countersink extending upward from said gripping surface of said traveling block.

7. The clamp of claim 5, further comprising a third portion of said threaded member of smaller diameter than both said upper and lower portions of said threaded member, said third portion being formed at the lowermost end of said lower portion of said threaded member and adapted for receiving said threaded fastener.

8. A clamp for securing wire rope comprising:
an outer housing forming a cavity therethrough for disposing flexible cord, said outer housing further comprising:
a gripping surface positioned within said cavity;
a plurality of substantially parallel walls on opposing interior surfaces of said cavity;
a traveling block substantially within said cavity, said traveling block forming a hole extending at least partly therethrough, said traveling block further comprising a gripping surface thereon opposing said gripping surface of said outer housing;
a second plurality of parallel walls on the exterior thereof for interacting with said parallel walls of said cavity such that movement of said traveling block is at least partially constrained along the longitudinal axis of said threaded member;
a threaded member in threaded engagement with said outer housing, said threaded member further comprising;
an upper portion having a means for causing rotation or counterrotation thereof;
a lower portion extending at least partly into said hole formed by said traveling block;
a bearing surface substantially between said upper and lower portions of said threaded member, such that rotation of said threaded member causes said bearing surface to move said traveling block and grip said wire rope between said gripping surface of said traveling block and said gripping surface of said outer housing;
a threaded fastener for threadedly engaging said lower portion of said threaded member and securing said traveling block to said threaded member; and
wherein said outer housing forms a release hole therethrough for facilitating the releasing of said threaded fastener, said release hole said release hole being formed through said gripping surface of said cavity through to the exterior of said outer housing.

9. The clamp of claim 8, further comprising a countersink located on said traveling block axially aligned with said hole formed by said traveling block, said countersink extending upward from said gripping surface of said traveling block.

10. The clamp of claim 8, further comprising a third portion of said threaded member of smaller diameter than both said upper and lower portions of said threaded member, said third portion being formed at the lowermost end of said lower portion of said threaded member and adapted for receiving said threaded fastener.

\* \* \* \* \*